Jan. 3, 1950     J. J. MADEKSHO     2,493,203
FISH BOX FOR BOATS
Filed Nov. 3, 1948
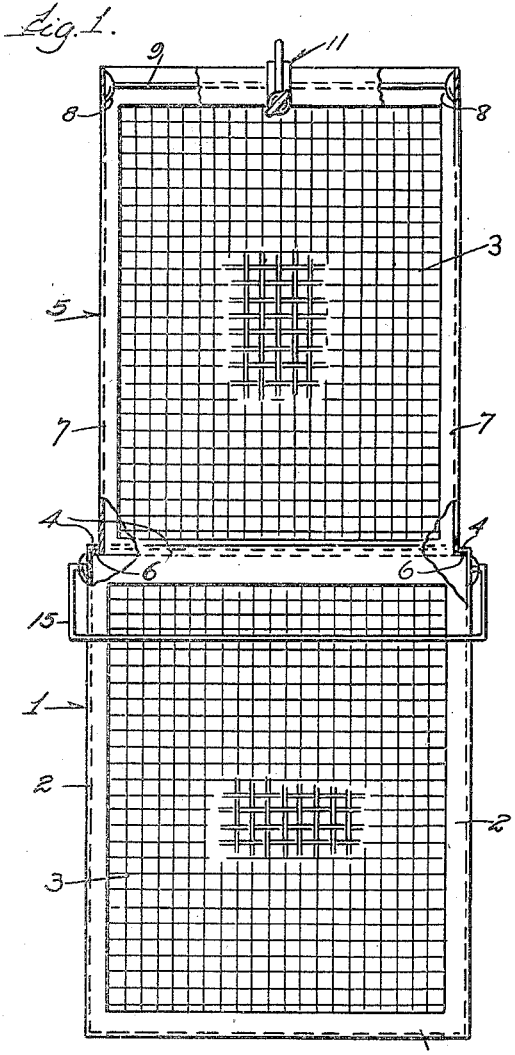
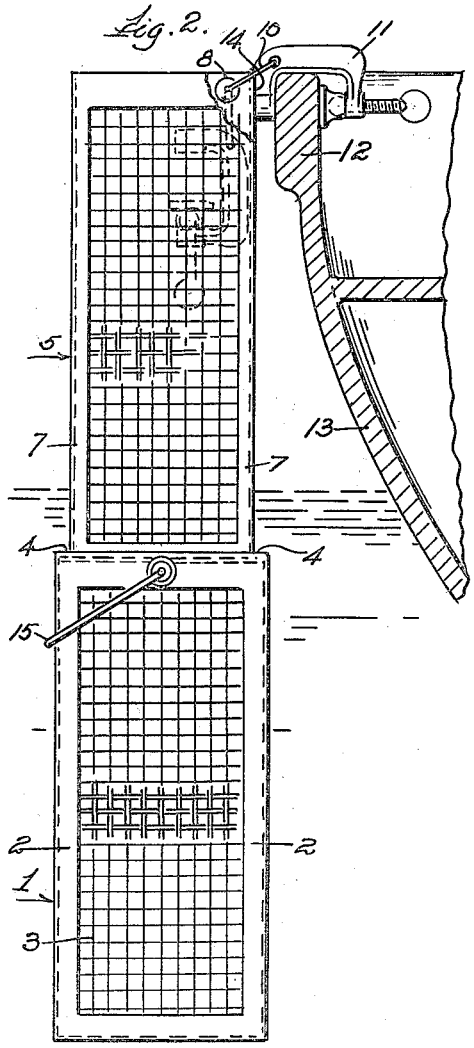
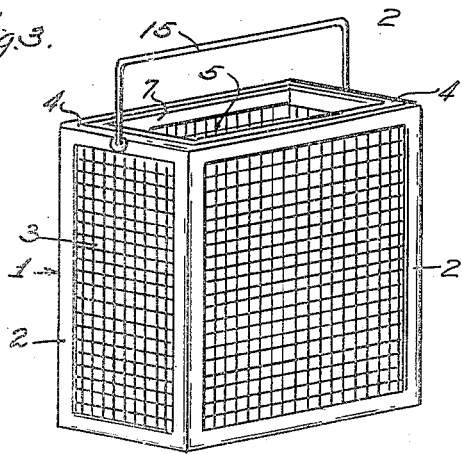
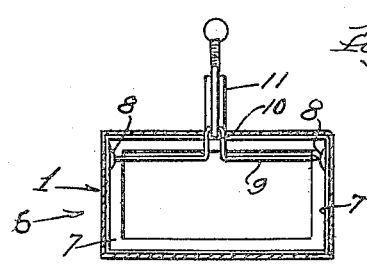
Inventor.
John J. Madeksho.
by H. J. Sanders
Attorney.

Patented Jan. 3, 1950

2,493,203

UNITED STATES PATENT OFFICE 2,493,203

FISH BOX FOR BOATS

John J. Madeksho, Chicago, Ill.

Application November 3, 1948, Serial No. 58,150

3 Claims. (Cl. 43—55)

This invention relates to improvements in live-boxes or fish boxes and more particularly to a live-box for fishermen adapted to retain fish and bait in live condition while fishing, the box being adapted for instant application to or removal from a fishing boat.

A further object is to provide a sectional telescopic live-box that when applied to the gunwale of a fishing boat one box section is adapted to be submerged through gravity and at the same time the other section is adapted to be partially disposed in the water but which, when detached from the boat and carried by the handle, the sections comprising the device may be caused to telescope into a compact convenient carrying position.

A still further object is to provide a live-box for fishermen having boat attaching means that positively support the box in parallel spaced relation to the gunwale of the boat thus effectually protecting both the box and its contents from damage at all times while in use.

A further object is to provide a live-box having means for attachment to a fishing boat which means when not in use may be instantly disposed in inoperative out-of-the-way position in one box section but ready for instant movement into engagement with the boat when desired. A further object is to provide a live-box of few parts that is of light weight, and that is of such shape as to permit it to be carried about conveniently.

My invention resides in the arrangement and combination of parts and in the details of construction described in the specification, pointed out in the appended claims and illustrated in the accompanying drawing. It is understood that I do not limit myself to the precise embodiment of the invention shown herewith as various changes may be made within the scope of what is claimed without departing from the spirit of the invention.

In the drawing:

Fig. 1 is a side elevational view, with parts in section, of the instant live-box in extended position.

Fig. 2 is an elevational view of the box shown in Fig. 1 but taken in a position turned at right angles thereto and illustrating its application to a fishing boat, the attaching means being shown in dotted lines within one box section in an inoperative position.

Fig. 3 is an elevational perspective view of the live-box in telescoped position, and, Fig. 4 is a top plan view of the inner box section.

The reference numeral 1 denotes the outer box preferably of oblong shape open at the top and including a frame formed of frame members 2 of angularly bent sheet metal or a similar material, the side, end and bottom walls of the box being formed of wire netting, wire mesh, or the like 3, the frame members at the top of the box being bent inwardly to form a flange 4 defining a mouth; an inner member 5 preferably of a shape similar to the box 1 being telescopically received in the latter box, open at its upper and lower ends and at its lower end provided with the outwardly disposed flange 6 which prevents complete withdrawal of the inner member from the outer by engagement of the flanges 4, 6.

The frame portions 7 of the inner member are formed of bent sheet metal or the like and the body walls of a mesh or netting 3. Secured to the inner faces of the frame portions 7 about the upper end of the inner member 5 adjacent one of the wider sides of the outer box are the bearings 8, 8 for the longitudinally extending rotary wire shaft 9 formed at approximately its central portion with a loop 10 to which the screw clamp 11 is pivotally secured, said screw clamp being adapted for engagement with the gunwale 12 of the fishing boat 13, said clamp having a straight edge portion 14 that engages one of the upper end frame portions 7 of the inner member when the screw clamp is applied to the boat 13 as shown, the clamp effectively attaching the live-box in parallel spaced relation to the gunwale of the boat.

When the screw clamp is disengaged from the gunwale of the fishing boat the clamp with the loop portion of the shaft 9 may be moved into the inner member where it will assume the suspended position shown in dotted lines in Fig. 2. When the inner member is released manually it will gravitate into telescoped position within the outer box as shown in Fig. 3 and the outer box provided with the handle 15 may be carried about by that member.

What is claimed is:

1. A fish box for boats comprising, a box-shaped outer container, a box-shaped inner member telescopically carried by said outer container, means terminally carried by said container and member preventing their complete separation from each other, a handle for said outer container, and means carried by said inner member for releasably attaching same to the gunwale of a boat, said means when released from a boat being movable into suspended position within the interior of said inner member.

2. In a fish box for boats, an outer reticulate container, an inner reticulate member telescopically carried by said outer container, means carried by said container and said member for preventing their complete separation, a rotary wire shaft carried at one end of said inner member, said shaft having a loop portion, a screw clamp formed with a straight edge carried by said shaft loop portion for releasable engagement with the gunwale of a boat, said screw clamp straight edge portion throughout its extent engaging one side of said inner member, and a handle for said outer container.

3. In a fish box for boats, an outer container, an inner open ended member, means carried by said container and member preventing their complete separation, a rotary wire shaft carried at one end of said inner member adjacent one side wall at the outer end thereof, said shaft having a loop portion movable into and out of said inner member as said wire shaft is oscillated in opposite directions, a screw clamp carried by said shaft loop portion for releasable engagement with the gunwale of a boat, said screw clamp having a straight edge portion that throughout its extent, in the clamp engaged position, is adapted to be disposed flush against one face of said inner member, and a handle for said outer container.

JOHN J. MADEKSHO.

REFERENCES CITED

The following references are of record in the file of this patent:

UNITED STATES PATENTS

| Number | Name | Date |
|---|---|---|
| 316,775 | Hardman | Apr. 28, 1885 |
| 458,529 | Williams | Aug. 25, 1891 |
| 1,327,040 | Haschke | Jan. 6, 1920 |

FOREIGN PATENTS

| Number | Country | Date |
|---|---|---|
| 44,229 | Sweden | Aug. 8, 1917 |